Aug. 30, 1966 H. S. DISHART 3,269,621
BABY CRADLE-LIKE CARRIER
Filed Sept. 9, 1965 2 Sheets-Sheet 1
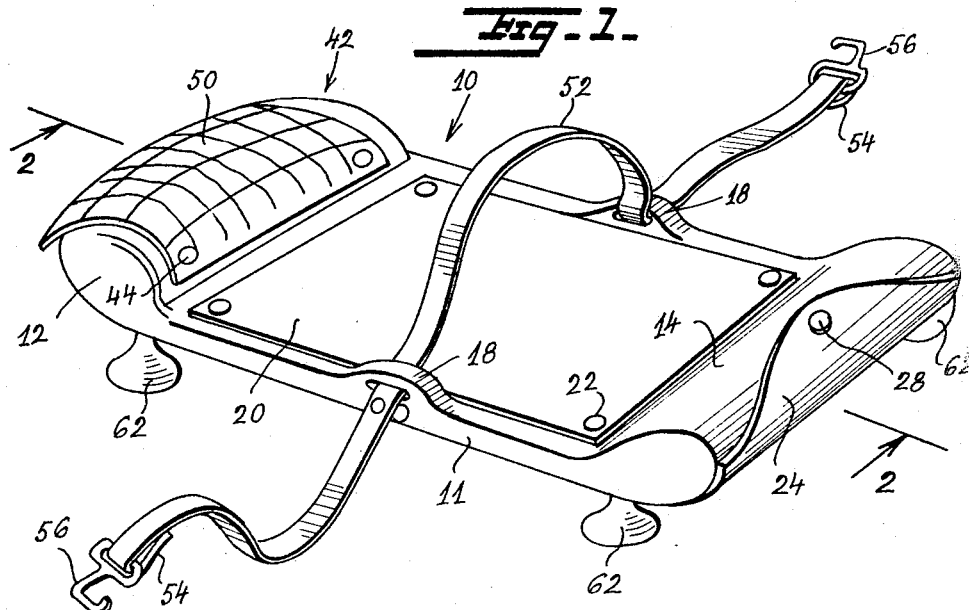
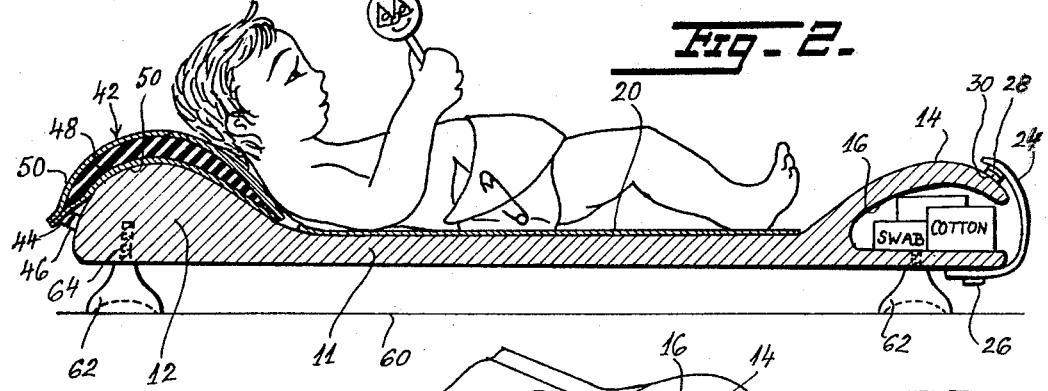
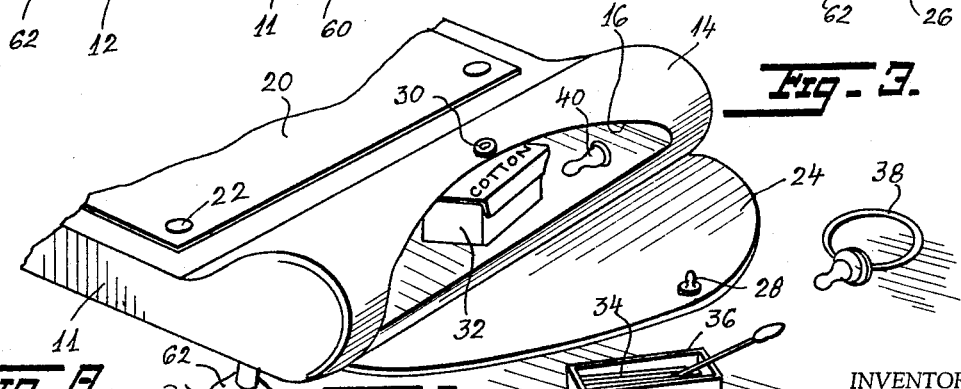
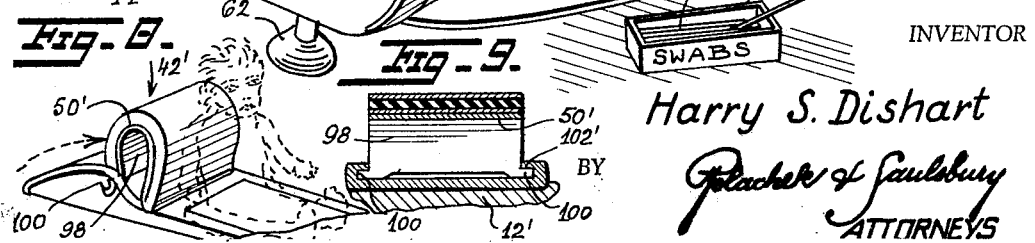
INVENTOR
Harry S. Dishart
BY
Placheck of Saulsbury
ATTORNEYS

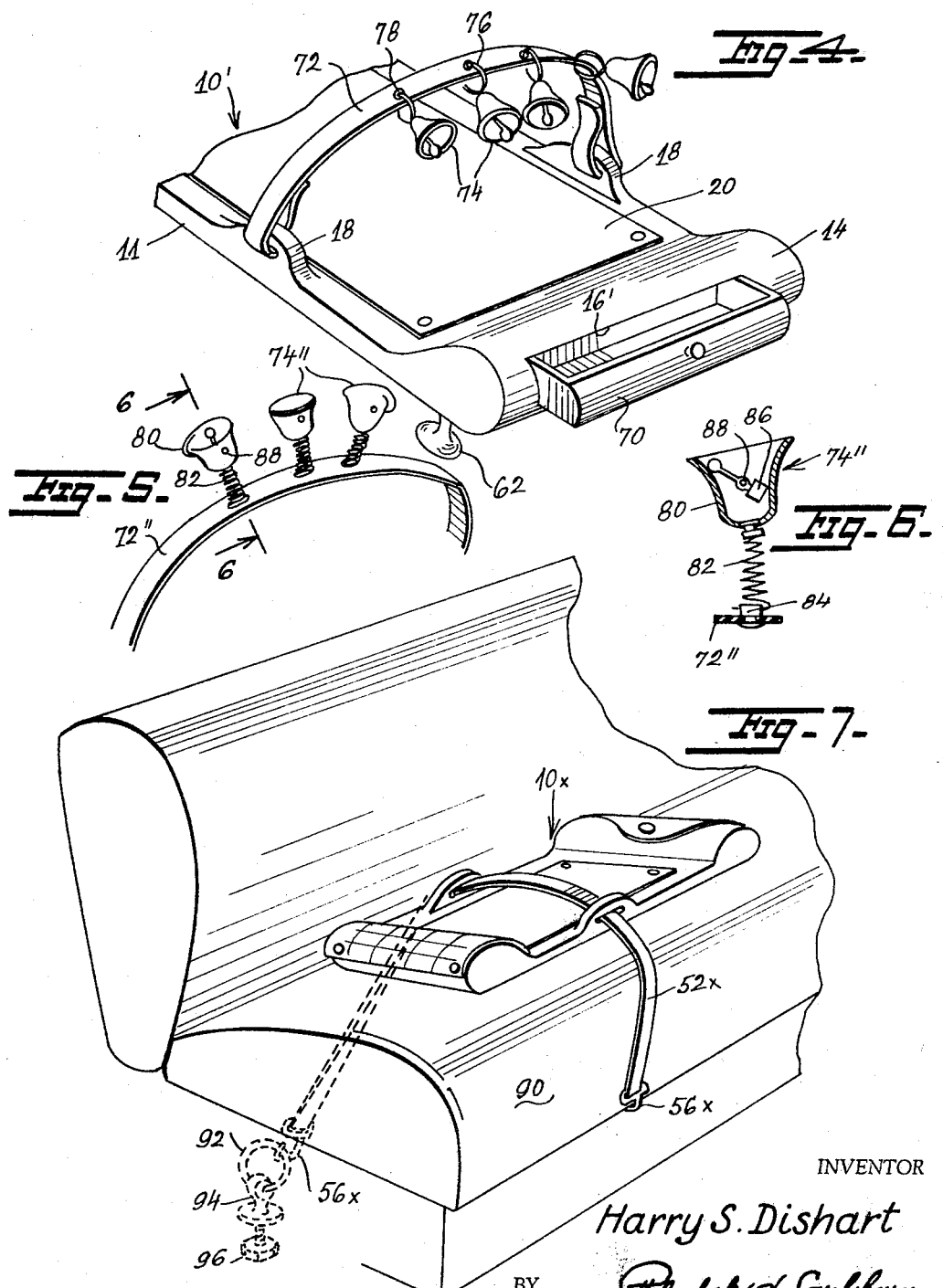

United States Patent Office 3,269,621
Patented August 30, 1966

1

3,269,621
BABY CRADLE-LIKE CARRIER
Harry S. Dishart, 137 Prospect Park SW.,
Brooklyn 18, N.Y.
Filed Sept. 9, 1965, Ser. No. 486,150
9 Claims. (Cl. 224—6)

This invention relates to new and useful improvements in baby cradle-like carriers.

The principal object of the present invention is to provide a baby carrier to which a baby is adapted to be strapped so that it may be carried about by its parent or nurse and receive the carrier's protection.

Another object is to provide a baby carrier which allows the baby to be carried without interfering with the arms and hands of the parent or nurse.

Still another object is to provide a baby carrier wherein a baby may be comfortably, safely and easily transported from place to place.

Yet another object of the invention is to provide a baby carrier wherein the baby's back is flat and straight.

Still another object of the invention is to provide a baby carrier provided with a pillow for supporting the head of the baby.

It is also an object of the invention to provide a baby carrier equipped with toilet articles and equipped with devices for amusing and attracting the attention of the baby.

A specific object of the invention is to provide a baby carrier that is readily converted from a carrier to a cot or bed and readily supported upon a horizontal surface such as a floor or seat of an automobile.

For further comprehension of the invention and of the objects and advantages thereof, reference will be had to the following description and accompanying drawings and to the appended claims in which the various novel features of the invention are more particularly set forth.

In the accompanying drawings forming a material part of this disclosure:

FIGURE 1 is a perspective view of a baby carrier embodying one form of the invention.

FIG. 2 is a sectional view taken on the plane of the line 2—2 of FIG. 1.

FIG. 3 is a top perspective view of one end of the carrier, the closure flap for the compartment being shown in open position, and toilet articles being shown removed.

FIG. 4 is a view similar to FIG. 3 of a baby carrier embodying a modified form of the invention, a drawer being shown partly open.

FIG. 5 is a perspective view of another modified form of bell mounting.

FIG. 6 is an enlarged vertical sectional view taken on the line 6—6 of FIG. 5.

FIG. 7 is a top perspective view of a baby carrier embodying still another modified form of the invention shown mounted on an automobile seat.

FIG. 8 is a modified form of pillow structure.

FIG. 9 is a cross-sectional view through the center thereof.

Referring in detail to the various views of the drawings, in FIG. 1 there is shown a baby carrier made in accordance with the invention and designated generally at 10. The baby carrier 10 comprises a rectangular shaped thin body 11 of wood, plastic or other suitable material, with flat top and bottom surfaces. At one end, the body is enlarged as indicated at 12 with curved outer contour. At the other end, the body is similarly enlarged as indicated at 14 but this enlargement is hollow forming a compartment 16, open at the front. At the sides of the body, midway the ends thereof, slotted lugs 18, 18 are formed. A thin fabric sheet 20 is tacked by tacks 22 to the top surface of the body to serve as a covering

2 therefor. A flexible fabric flap 24 serves as a closure for the open front of the compartment 16. The flap is tacked to the bottom surface of the body by tacks 26 and carries a snap fastener element 28 to coact with a snap fastener element 30 on the enlargement 14 centrally thereof. The compartment 16 is used for storing toilet articles for babies such as cotton cloth in a box 32, swabs 34 in a box 36, a teething ring 38, nipple 40 and the like.

A pillow structure 42 is fastened to the outer surface of the enlargement 12 by means of snap fastener elements 44 on the pillow structure coacting with snap fastener elements 46 on the enlargement 12. The pillow structure is composed of a pad 48 of foam rubber enclosed between fabric sheets 50, 50.

An elongated flexible leather strap 52 is adapted to be inserted through the aligned slots in the lugs 18 and therebeyond. The strap is formed with loops 54 at the ends thereof for supporting metal hooks 56.

In use, the baby is placed on the carrier with its back flat against the body 11 of the carrier and with its head on the pillow structure 12 as best seen in FIG. 2. The strap 52 is placed over the baby and the carrier 19 mounted on the back of the adult and the strap encircled around the adult and the hooks interlocked to secure the carrier on the back of the adult. The carrier permits the adult to carry a baby upon his back in the natural piggy-back position for substantial periods of time and over long distances without tiring. The carrier also permits the adult to assume a natural upright walking posture without backward pull and enables him to carry a child with relative ease.

For the purpose of converting the carrier 10 into a cot or bed for detachable mounting on a horizontal supporting surface such as indicated at 60 in FIG. 2, a pair of spaced suction cups 62 is fixed to the body 11 at each end thereof by screws 64.

In FIG. 4, a modified form of baby carrier 10′ is shown. The carrier 10′ differs from carrier 10 merely in that in place of the closure flap 24, a drawer 70 is slidably mounted in the compartment 16′ in the enlargement 14 for holding toilet articles. Furthermore, a rubber belt 72 is substituted for the fastening strap 52. A plurality of bells 74 are pivotally supported on the belt by means of wires 76 looped through holes 78 in the belt. The bells amuse the infant and hold his attention.

In all other purposes, carrier 10′ is similar to carrier 10 and similar reference numerals are used to indicate similar parts.

In FIGS. 5 and 6 modified forms of bells 74″ supported on the belt 72″ are shown. The cup-shaped bodies 80 of the bells 74″ are mounted on the top ends of coil springs 82, the bottom ends of the springs being secured to rivets 84 in the belt 72″. A clapper 86 is pivotally mounted in each cup-shaped body 80 on a pivot pin 88 extending across the body.

FIG. 7 illustrates another modified form of baby carrier 10x supported flatwise on a seat 90 of an automobile. The carrier 10x is similar to carrier 10 except that the suction cups 62 of carrier 10 are omitted. The carrier 10x is fastened to the seat by means of the strap 52x. One hooked end 56x of the strap is hooked under the bottom front edge of the seat, and the other hooked end 56x hooked to a ring 92 pivotally secured to a bolt 84 and nut 96 assembly embedded in the seat bottom, at the rear.

In FIGS. 8 and 9, a modified form of pillow structure 42′ is shown. The structure 42′ is similar to the pillow structure 42 except that a sheet of spring metal 98 is suitably fastened to the undersurface of the bottom fabric sheet 50′. The metal sheet 98 is formed with laterally projecting lugs 100 adapted to ride in grooves 102 formed in the sides of the enlarged portion 12' of the body 11. The lugs are adapted to drop down into the grooves so as to be held in moved position.

With this form of pillow structure 42', the structure can be manually moved into looped position as shown in FIG. 8 providing a rigid support for the infant when seated. The spring sheet will cause the structure to snap back to normal position when the lugs are manually displaced.

While I have illustrated and described the preferred embodiments of my invention, it is to be understood that I do not limit myself to the precise constructions herein disclosed and that various changes and modifications may be made within the scope of the invention as defined in the appended claims.

What is claimed is:

1. A baby carrier of the kind described comprising a rectangular shaped thin body having opposed slotted lugs projecting upwardly of the top surface at the sides of the body, and a flexible strap extending through the slots in the lugs and therebeyond for fastening a baby on the body and for fastening the body with baby to the back of an adult.

2. A baby carrier of the kind described comprising a rectangular shaped thin body having enlargements at both ends thereof projecting upwardly of the top surface of the body, opposed slotted lugs projecting upwardly from the side edges of the body, and a flexible strap extending through the slots in the lugs and therebeyond for fastening a baby on the body and for fastening the body with baby to the back of an adult.

3. A baby carrier of the kind described comprising a rectangular shaped thin body having enlargements at both ends thereof projecting upwardly of the top surface of the body, opposed slotted lugs projecting upwardly from the side edges of the body, and a flexible strap extending through the slots in the lugs and therebeyond for fastening a baby on the body and for fastening the body with baby to the back of an adult, one of said enlargements having a compartment therein for storing toilet articles and a openable flap closing the compartment.

4. A baby carrier of the kind described comprising a rectangular shaped thin body having enlargements at both ends thereof projecting upwardly of the top surface of the body, opposed slotted lugs projecting upwardly from the side edges of the body, and a flexible strap extending through the slots in the lugs and therebeyond for fastening a baby on the body and for fastening the body with baby to the back of an adult, one of said enlargements having a curved outer contour, and a pillow structure detachably mounted on said one enlargement.

5. A baby carrier of the kind described comprising a rectangular shaped thin body having enlargements at both ends thereof projecting upwardly of the top surface of the body, opposed slotted lugs projecting upwardly from the side edges of the body, and a flexible strap extending through the slots in the lugs and therebeyond for fastening a baby on the body and for fastening the body with baby to the back of an adult, one of said enlargements having a curved outer contour, a pillow structure detachably mounted on said one enlargement, the other of said enlargements having a compartment therein for storing toilet articles and an openable flap closing the compartment.

6. A baby carrier of the kind described comprising a rectangular shaped thin body having enlargements at both ends thereof projecting upwardly of the top surface of the body, opposed slotted lugs projecting upwardly from the side edges of the body, a flexible strap extending through the slots in the lugs and therebeyond, fastening elements on the ends of the strap, a pillow structure detachably mounted on the outer surface of one of said enlargements, a compartment in the other of said enlargements for holding toilet articles, said compartment open at the front, and an openable flap closing the opening in the compartment, said strap adapted to fasten a baby on the body of the carrier and adapted to fasten the carrier and baby to the back of an adult.

7. A baby carrier of the kind described as defined in claim 6 characterized by suction cups depending from the bottom surface of the body at the corners thereof.

8. A baby carrier of the kind described in combination with an automobile seat, said carrier comprising a rectangular shaped body having enlargements at both ends thereof projecting upwardly of the top surface of the body, said body seated flatwise on said automobile seat, opposed slotted lugs projecting upwardly from the side edges of the body, a flexible strap having looped locking hooks, said strap extending through the slotted lugs and over the seat and downwardly thereof, one of the end hooks hooked under the seat, the other of said end hooks hooked over an anchored ring at the bottom of the seat as its rear, and a pillow structure detachably mounted on the outer surface of one of said enlargements.

9. A baby carrier of the kind described comprising a rectangular shaped thin body having enlargements at both ends thereof projecting upwardly of the top surface of the body, opposed slotted lugs projecting upwardly from the side edges of the baby, a flexible strap extending through the slots in the lugs and therebeyond for fastening a baby on the body and for fastening the body with baby to the back of an adult, one of said enlargements having a curved outer contour, a pillow structure detachably and slidably mounted on said one enlargement, the other of said enlargements having a compartment therein for storing toilet articles and an openable flap closing the compartment, said pillow structure including a sheet of rubber enclosed in fabric sheets and a sheet of springy metal secured to one of said fabric sheets, sheet metal sheet permitting the structure to be deformed into a loop to provide a rigid support for an infant when seated, said structure adapted to be snapped back to normal condition.

References Cited by the Examiner

UNITED STATES PATENTS

| 1,198,423 | 9/1916 | De Lude et al. | 224—25 |
| 2,742,212 | 4/1956 | Siftar | 224—6 |
| 2,973,889 | 3/1961 | Phillips | 224—6 |

GERALD M. FORLENZA, *Primary Examiner.*

F. WERNER, *Assistant Examiner.*